(12) United States Patent
Manfred et al.

(10) Patent No.: US 7,145,501 B1
(45) Date of Patent: Dec. 5, 2006

(54) METHODS AND SYSTEMS FOR MEASURING TERRAIN HEIGHT

(75) Inventors: Mark T. Manfred, Edina, MN (US); Curtis J. Call, Stillwater, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/235,464

(22) Filed: Sep. 26, 2005

(51) Int. Cl.
- *G01S 13/08* (2006.01)
- *G01S 7/40* (2006.01)
- *G01S 13/00* (2006.01)

(52) U.S. Cl. ............... 342/120; 342/118; 342/165; 342/173; 342/174; 342/175; 342/195; 73/384

(58) Field of Classification Search .... 342/25 R–25 F, 342/118, 120–123, 175, 190–197, 165–174; 701/3–13; 73/384; 340/963, 970
See application file for complete search history.

(56) References Cited

U.S. PATENT DOCUMENTS

| | | | |
|---|---|---|---|
| 4,144,571 A * | 3/1979 | Webber | 342/120 |
| 4,924,401 A | 5/1990 | Bice et al. | |
| 5,272,639 A | 12/1993 | McGuffin | |
| 5,892,462 A | 4/1999 | Tran | |
| 6,157,891 A * | 12/2000 | Lin | 342/194 |
| 6,233,522 B1 | 5/2001 | Morici | |
| 6,246,960 B1 | 6/2001 | Lin | |
| 6,427,122 B1 | 7/2002 | Lin | |
| 6,462,703 B1 * | 10/2002 | Hedrick | 342/120 |
| 6,484,072 B1 | 11/2002 | Anderson et al. | |
| 6,507,289 B1 * | 1/2003 | Johnson et al. | 340/970 |
| 6,512,976 B1 | 1/2003 | Sabatino et al. | |
| 6,516,272 B1 | 2/2003 | Lin | |
| 6,538,581 B1 | 3/2003 | Cowie | |
| 6,583,733 B1 | 6/2003 | Ishihara et al. | |
| 6,584,839 B1 * | 7/2003 | Hedrick | 73/384 |
| 6,606,034 B1 | 8/2003 | Muller et al. | |
| 6,690,317 B1 | 2/2004 | Szeto et al. | |
| 6,737,987 B1 | 5/2004 | Conner et al. | |
| 6,785,594 B1 * | 8/2004 | Bateman et al. | 701/9 |
| 6,906,641 B1 | 6/2005 | Ishihara | |
| 2002/0126041 A1 * | 9/2002 | Hedrick | 342/120 |
| 2002/0188386 A1 * | 12/2002 | Day | 701/4 |

OTHER PUBLICATIONS

"Interim Guidelines for Examination of Patent Applications for Patent Subject Matter Eligibility"; United States Patent and Trademark Office; Alexandria, Virginia; Oct. 26, 2005.*

* cited by examiner

*Primary Examiner*—Bernarr E. Gregory
(74) *Attorney, Agent, or Firm*—Dina Khaled, Esq.; Armstrong Teasdale LLP

(57) ABSTRACT

An altitude measuring system is described that includes a radar altimeter configured to measure altitude and a digital terrain map database. The database includes data relating to terrain elevation and at least one data parameter relating to an accuracy of the terrain elevation data and the altitude measured by the radar altimeter. The system is configured to weigh an altitude derived from the terrain elevation data and the radar altimeter measurements according to the at least one data parameter.

18 Claims, 4 Drawing Sheets

METHODS AND SYSTEMS FOR MEASURING TERRAIN HEIGHT

BACKGROUND OF THE INVENTION

This invention relates generally to terrain height measurement, and more specifically, to methods and systems for measuring a terrain height which take into account seasonal and other variations in the terrain.

Aircraft precision landing systems based on Global Navigation Systems (GNSs) such as the global positioning system (GPS) and Spaced Based Augmentation Systems (SBASs) such as the Wide Area Augmentation System (WAAS), which is a form of differential GPS, generally face a greater challenge for accuracy and integrity of vertical position (i.e., altitude above sea level) measurements than for horizontal position (i.e., latitude and longitude) measurements. As such, barometric altimeters and GNS/SBAS receivers are not sufficiently accurate for some precision landing operations.

Landing systems have been proposed to improve altitude accuracy by augmenting GPS/WAAS systems with a radar altimeter that is combined with a digital terrain database. The radar altimeter/digital terrain database combination calculates altitude, for example, relative to sea level, by adding a radar altimeter measured altitude, that is relative to terrain height, to a terrain height that is relative to sea level, as tabulated in the digital terrain database. However, the accuracy of altitude derived from radar altimeter/digital terrain database can vary from one geographical region to another.

One reason for such variances is due to the variations in surface conditions over time. For example, a forest can cause the radar altimeter to measure an altitude with respect to the height of the tree tops in summer when trees are leafed out. The same radar altimeter may measure the altitude with respect to the ground when leaves are down. This seasonal effect can cause significant variations, for example, in excess of forty feet, in the radar altimeter/digital terrain database calculated altitude.

Another reason for such variances is that the terrain may be surveyed more accurately and/or with higher resolution over some geographical areas than over other areas. For example, the terrain may be surveyed very accurately and with high resolution near a major airport, but have lower accuracy and/or resolution in remote areas, causing spatial variations in the accuracy of the digital terrain database.

Further, terrain is generally not flat within the region represented by each point in the digital terrain database. For example, the region may include hills and structures. Some digital terrain databases provide height above sea level for the highest point within the region represented by that database entry. A single terrain height measurement may not accurately reflect the terrain height over the entire region.

Horizontal errors from the aircraft's navigation system may also contribute to altitude errors derived from radar altimeter/digital terrain database if the terrain below is not perfectly horizontal. A navigation error may cause the altimeter to select the wrong location in the digital terrain database. The magnitude of this error is directly related to the slope of the terrain. In addition, nearby terrain can affect the altitude measurements. Radar altimeters radiate their pulses in a conically shaped pattern below the aircraft. The radar altimeter signal may be affected, for example, by nearby hills to the left or right of the aircraft's flight path.

Integrating the radar altimeter/digital terrain database calculated altitude with an inertial reference system (IRS) can smooth out localized terrain variations, for example, those that might be caused by construction of a new building. However, integrating the radar altimeter/digital terrain database calculated altitude with an inertial reference system cannot effectively eliminate correlated errors in a calculated altitude that might occur over a longer distance, for example, those errors that occur over several miles such as caused by seasonal variations within an expanse of forest.

BRIEF SUMMARY OF THE INVENTION

In one aspect, an altitude measuring system is provided that comprises a radar altimeter configured to measure altitude and a digital terrain database. The digital terrain database comprises data relating to terrain elevation and at least one data parameter relating to an accuracy of the terrain elevation data and the altitude measured by the radar altimeter. The system is configured to weigh an altitude derived from the terrain elevation data and the radar altimeter measurements according to the at least one data parameter.

In another aspect, a method for determining an altitude of an air vehicle is provided. The method comprises measuring an altitude using a radar altimeter, retrieving data from a database relating to an accuracy of at least one of radar altimeter measurements for the location and digital terrain database elevation data for the location, and weighting the altitude as determined by the radar altimeter according to the accuracy data for the location retrieved from the database.

In still another aspect, a terrain map database comprising map data relating to a number of locations is provided. The map data comprises at least one data field relating to an accuracy for at least one of radar altimeter measurements and digital terrain database elevations for each map location.

DETAILED DESCRIPTION OF THE INVENTION

Aircraft landing systems that use altitudes derived from radar altimeters and terrain databases need to know with a high level of confidence whether or not derived altitude is accurate as the aircraft approaches the runway. This confidence level is sometimes referred to as integrity. For example, some aircraft landing systems may calculate a parameter called the vertical protection level (VPL) that indicates the maximum altitude measurement error to a 99.99999% confidence level. This high confidence level may require special procedures to certify that the digital terrain database is accurate in selected regions, for example, the region extending four miles beyond the end of a runway to a width of 0.5 mile on either side of the runway. As an alternative, only a small area in front of the runway may be certified, for example a 0.5 miles square area located three miles beyond the end of the runway, if that area is known to provide excellent accuracy for an altitude derived from radar altimeter measurements combined with altitude data from a digital terrain database. Terrain outside such regions may not require such special certification for accuracy. The special certification might be achieved, for example, by flying an aircraft over the region several times, and comparing radar altimeter measured altitude combined with digital terrain database altitude (e.g., elevation) against an altitude derived from an independent truth system.

Figure 1:
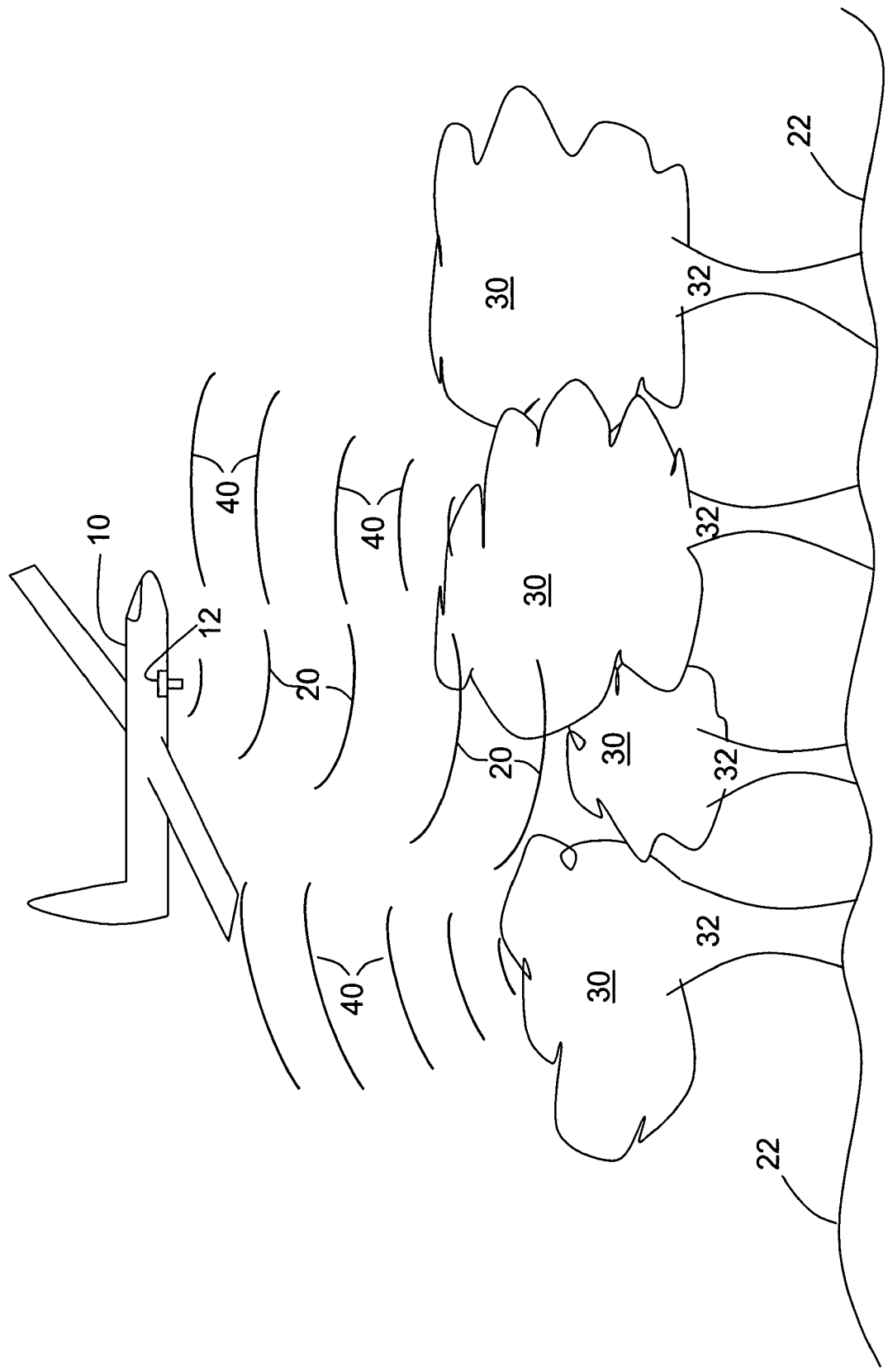
FIG. 1 is a diagram illustrating a radar altimeter measurement over a forest whose trees are fully leaved.

FIG. 1 is a diagram illustrating a radar altimeter measurement over a forest whose trees are fully leaved. More specifically, an air vehicle 10 is configured with a radar altimeter 12. Radar altimeter 12 is configured to output one or more radar pulses 20 towards the ground 22. However, when the ground 22 includes a forested terrain, most of radar pulses 20 do not reach the ground 22. Instead, radar pulses 20 are reflected off the leaves 30 of trees 32 in the forest. As such, radar return pulses 40, while correctly indicative of air vehicle height above trees 32, are not correctly indicative of height above the ground below 22. Therefore, when combining the radar altimeter altitude measurements with an elevation stored in a digital terrain database, a correct altitude of air vehicle 10 may not be obtained.

Figure 2:
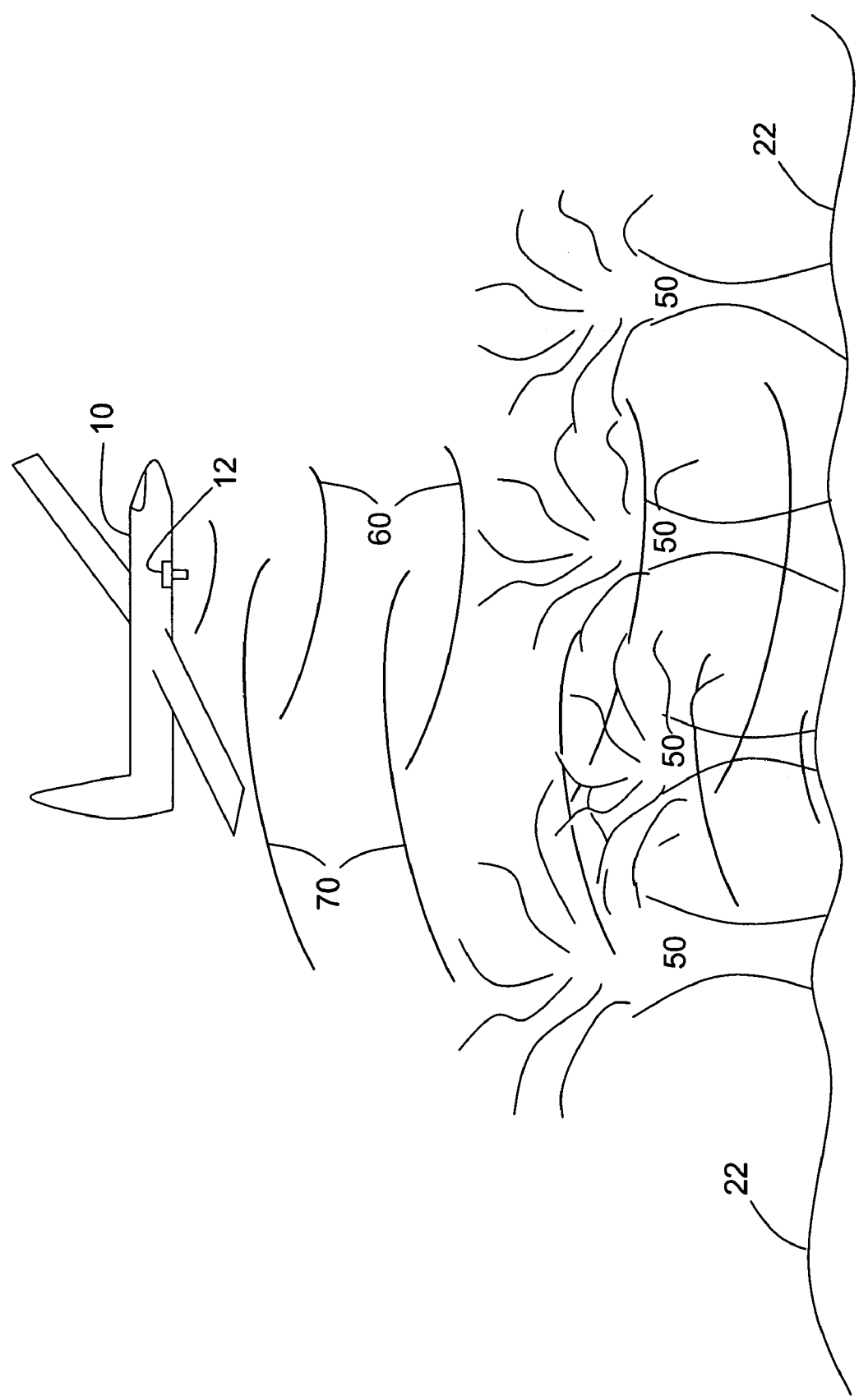
FIG. 2 is a diagram illustrating a radar altimeter measurement over a forest whose trees do not currently have leaves.

FIG. 2 is a diagram illustrating a radar altimeter measurement over a forest whose trees 50 do not currently have leaves. Above the leafless tree forest, radar altimeter 12 is still configured to output one or more radar pulses 20 towards the ground 22. However, when trees 50 are without leaves, a majority of radar pulses 60 may reach the ground 22. As such, radar pulses 60 are reflected off the ground 22 of the forest. As a result, radar return pulses 70, are correctly indicative of the height of the air vehicle above the ground, therefore resulting in a correct indication of air vehicle height above the ground below.

Figure 3:
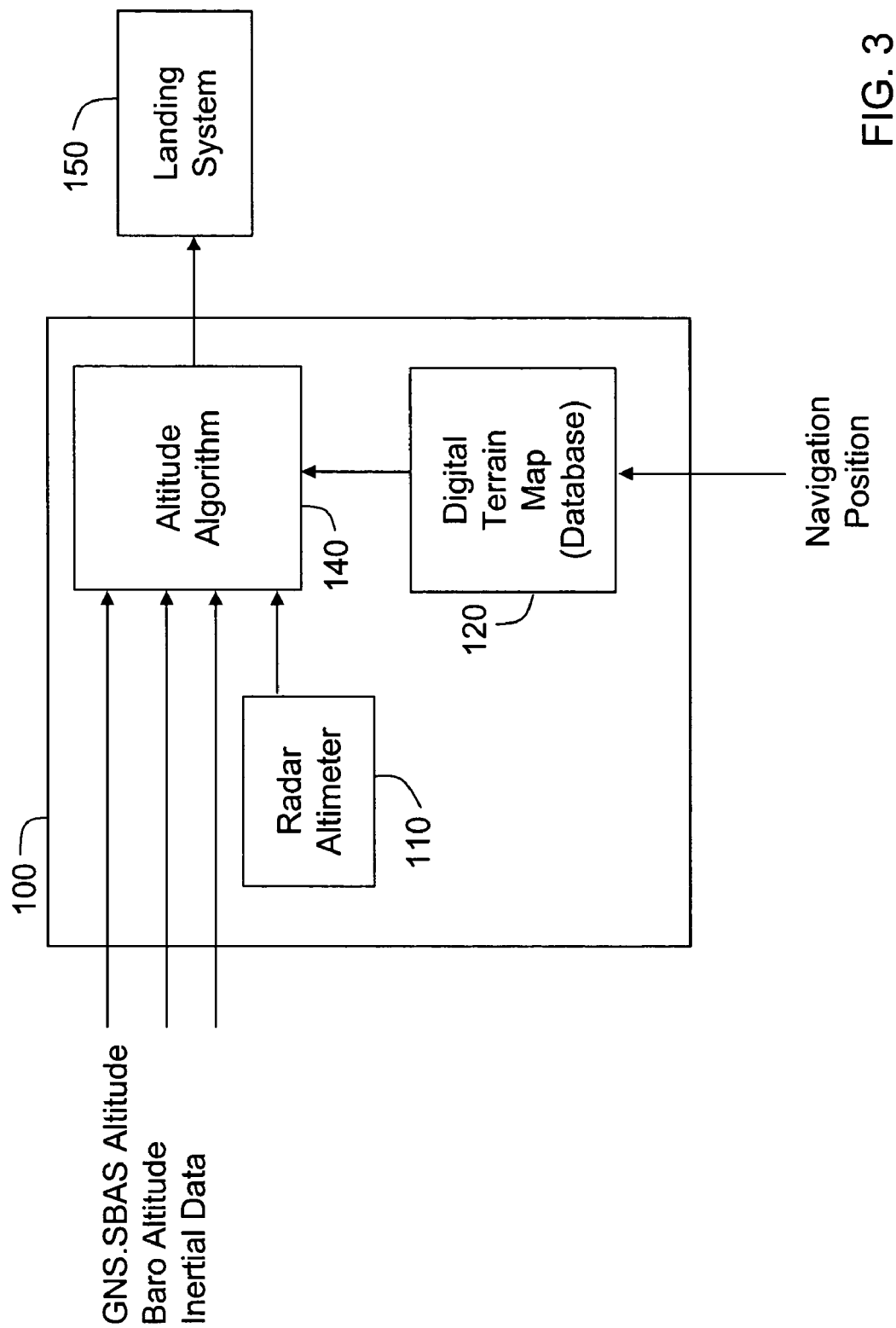
FIG. 3 is a block diagram of an altitude measuring system which includes a radar altimeter and a digital terrain database.

FIG. 3 is a block diagram of an altitude measuring system 100, which includes a radar altimeter 110, a digital terrain database 120, and an altitude algorithm 140. The digital terrain database 120 includes the usual terrain height information (relative to sea level) for each geographical location stored in the database 120, for example, accuracy, resolution, repeatability, slope and integrity of surface conditions, as well as data relating to terrain height above sea level. In the embodiment, database 120 has been upgraded to also include a parameter relating to the database accuracy for each location stored in the database 120. In one embodiment, altitude algorithm 140 uses a Kalman filter to calculate the aircraft's altitude above sea level. Inputs to the Kalman filter include one or more of a barometric altimeter, a GPS altimeter, an inertial reference system, an altitude signal obtained by adding the radar altimeter's height above terrain measurement to the terrain database height, and the database accuracy signals from the digital terrain database. The Kalman filter within altitude algorithm 140 heavily weights the altitude received from radar altimeter 110 and terrain height database over areas (terrains) where the database accuracy is highly accurate. The Kalman filter 140 within altitude algorithm 140 is configured to assign a low weighting to the altitude received from radar altimeter 110 and terrain height database over areas where the database accuracy is considered to be low.

Digital terrain map database 120, as described above, is configured to also include information regarding the database accuracy for each particular map location within database 120. In one embodiment, this database accuracy parameter may include an estimate of the standard deviation of the altitude error derived from radar altimeter measurements combined with digital terrain database data that is expected above each location. For example, the standard deviation might be one foot over a terrain that includes a large level plain without any trees and that has been accurately surveyed to high resolution, and the standard deviation may be twenty feet or more over a forested terrain that has been sparsely surveyed. Altitude algorithm 140 provides altitude data, including the database accuracy parameter, to landing system 150. In one embodiment, landing system 150 is configured with an algorithm, for example, a Kalman filter, that integrates the altitude data from altitude algorithm 140 with GPS/WAAS altitude, barometric altitude and inertial data that is received from systems external to altitude measuring system 100. In one embodiment, the algorithm in landing system 150 is configured to apply a weighting to the altitude from altitude algorithm 140 (e.g., the radar altimeter measurements combined with digital terrain database data) based on a standard deviation associated with the database accuracy parameter. For example, landing system 150 is configured to weight the altitude from altitude algorithm 140 heavier while the airplane is flying over highly surveyed areas, for example, areas surrounding an airport than the weighting applied while the airplane is flying over a forest, which is generally sparsely surveyed.

Figure 4:
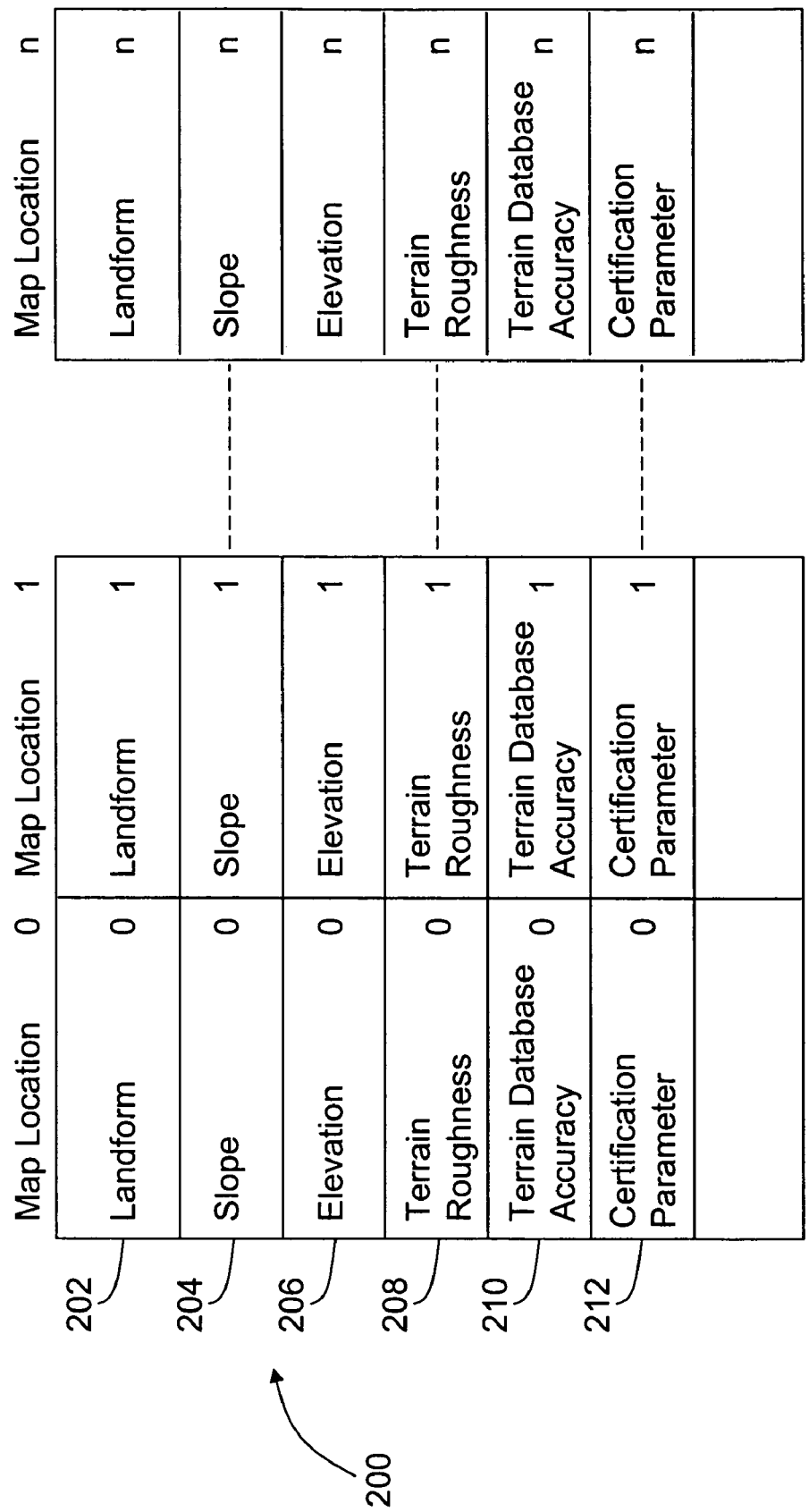
FIG. 4 is a table illustrating data within a digital terrain database, the data including a parameter relating to the repeatability of the surface condition measurement.

FIG. 4 is a table 200 illustrating one embodiment of contents of a digital terrain map database 120. For each location included in database 120, in the embodiment illustrated, data in database 120 includes landform data 202, slope data 204, elevation above sea level data 206, and terrain roughness data 208 in a digital format. In one embodiment, database 120 is a uniform matrix of terrain elevation values, for example, with post spacing every three arc seconds (approximately every 100 meters). The information content of database 120 is approximately equivalent to the contour information represented on a 250,000 scale map.

In one embodiment, table 200, and therefore database 120, includes an additional parameter, described herein as terrain database accuracy 210, that relates to an accuracy of the terrain surface data that might be utilized with altimeter measurements of radar altimeter 110 to determine an altitude of an air vehicle. Database accuracy 210 is utilized, as described above, to apply a confidence weighting to altitude determinations of the radar altimeter/digital terrain database combination. As described above, for map locations where surface conditions are highly accurate, database accuracy 210 provides a heavier weighting to, for example, a terrain accuracy or repeatability to be applied to radar altimeter measurements. For map locations where surface conditions are not highly accurate, database accuracy 210 provides a lesser weighting to be applied to radar altimeter measurements. In one embodiment, the weighting factor of database accuracy is a standard deviation relating to the altitude error derived from the combination of radar altimeter 110 and digital terrain database 120 that is expected above each map location.

In an alternative embodiment, table 200, and therefore database 120, includes an additional parameter, described herein as a certification parameter 212. Precision landing systems require high levels of integrity as pilots rely on the information that these systems provide. However, the integrity of an altitude signal derived from a radar altimeter and digital terrain database combination is often limited by the integrity of the terrain database. To provide a level of confidence, for example, in an altitude signal, portions of the terrain database 120 may be certified to be accurate.

It is nearly impossible to certify the accuracy of an entire terrain database. For example, a terrain database for the USA would likely include millions of locations, and to certify all of these location would require an impractically large expenditure of resources. However, table 200, which is illustrative of multiple embodiments of terrain database 120, includes certification parameter 212 which is an indication as to whether the terrain height has been certified at that database location.

Incorporation of certification parameter provides for a configuration of an altimeter system that places less reliance on radar altimeter measurements that have been combined with digital terrain height data from map database locations that have not been certified. With such a configuration, only a few locations on the approach path to each runway need to be certified, particularly the locations that have a good terrain database accuracy. Such a configuration represents a large reduction in the number of locations that need to be certified. In still another embodiment (not shown in FIG. 4) terrain database accuracy 210 and certification parameter 212 are combined into a single bit parameter in the terrain database. For example, a logical one in the bit, might mean the location is certified and the surface is accurate for a radar altimeter, and a logical zero in the bit means the location is not certified or it is not accurate for a radar altimeter.

Many aircraft landing systems calculate two parameters, called Vertical Protection Level (VPL) and Vertical Figure of Merit (VFOM), in order to determine whether the airplane is allowed to land. VPL is an estimate of the worst-case altitude error (generally to a 99.99999% confidence level) and VFOM is an estimate of the altitude accuracy (generally to a 95% confidence level). These parameters become extremely important for some landing systems because the airplane needs to divert to another airport if VPL and/or VFOM exceed their allowable thresholds. Each runway-end generally has a unique allowable threshold for VPL and VFOM. The digital terrain database repeatability parameter can be very useful for calculating VPL and VFOM. In one embodiment, the Kalman Filter within altitude algorithm 140 is configured to calculate VPL and VFOM based at least partly on one or more of terrain database accuracy 210 and the certification parameter 212 from table 200 or based at least partly on the combination of the two.

While the invention has been described in terms of various specific embodiments, those skilled in the art will recognize that the invention can be practiced with modification within the spirit and scope of the claims.

What is claimed is:

1. An altitude measuring system comprising:
    a radar altimeter configured to measure an altitude; and
    a digital terrain database comprising data relating to terrain elevation and at least one data parameter relating to an accuracy of the terrain elevation data and the altitude measured by said radar altimeter.

2. An altitude measuring system according to claim 1 wherein said system is configured to weight an altitude derived from the terrain elevation data and said radar altimeter measurements according to said at least one data parameter.

3. An altitude measuring system according to claim 1 wherein said at least one data parameter comprises an estimate of the altitude error expected at each map location.

4. An altitude measuring system according to claim 3 wherein said estimate of the altitude error comprises a standard deviation of the error expected at the location.

5. An altitude measuring system according to claim 1 wherein said at least one data parameter comprises an assessment of whether or not the terrain is suitable for an accurate altimeter measurement.

6. An altitude measuring system according to claim 5 wherein the assessment of whether or not the terrain is suitable for an accurate altimeter measurement comprises data relating to at least one of repeatability, accuracy, and resolution of the stored terrain data.

7. An altitude measuring system according to claim 1 wherein said at least one data parameter comprises data indicating whether or not the terrain data within said database has been certified.

8. An altitude measuring system according to claim 1 further comprising a landing system algorithm configured to integrate a radar altimeter measured altitude, weighted by said at least one data parameter, with at least one of a GNS/SBAS altitude, a barometric altitude, and inertial data.

9. An altitude measuring system according to claim 8 wherein said landing system algorithm comprises a Kalman filter.

10. An altitude measuring system according to claim 8 wherein to integrate the weighted radar altimeter altitude, said altitude measuring system is configured to apply a weighting to the radar altimeter altitude based on a standard deviation of the accuracy of at least one of the radar altimeter measured altitude and the elevation for the location within said digital terrain database.

11. A method for determining an altitude of an air vehicle, said method comprising:
    measuring an altitude using a radar altimeter;
    retrieving data from a database relating to an accuracy of at least one of radar altimeter measurements for the location and digital terrain database elevation data for the location; and
    weighting the altitude as determined by the radar altimeter according to the accuracy data for the location retrieved from the database.

12. A method according to claim 11 wherein retrieving data from a database comprises retrieving an estimate of altitude error expected at the map location.

13. A method according to claim 12 retrieving an estimate of altitude error comprises retrieving a standard deviation for the altitude at the map location.

14. A method according to claim 11 further comprising weighting the altitude with at least one of a GNS/SBAS altitude, a barometric altitude, and inertial data.

15. A method according to claim 14 wherein integrating the weighted altitude comprises filtering the weighted altitude utilizing a Kalman filter.

16. A method according to claim 11 wherein weighting the altitude as determined by the radar altimeter comprises applying a weighting to the radar altitude based on a standard deviation of the repeatability of the measured altitude.

17. A method according to claim 11 further comprising verifying whether digital terrain database elevation data for the location has been certified.

18. A method according to claim 11 further comprising integrating radar altimeter measured altitude with at least one of a GNS/SBAS altitude, a barometric altitude, and received inertial data.

* * * * *